(12) United States Patent
Nakajima

(10) Patent No.: US 8,638,474 B2
(45) Date of Patent: Jan. 28, 2014

(54) IMAGE PROCESSING APPARATUS AND COLOR CONVERSION TABLE GENERATING METHOD

(75) Inventor: Takehiro Nakajima, Tokyo (JP)

(73) Assignee: Ricoh Company-Limited, Tokyo (JP)

( * ) Notice: Subject to any disclaimer, the term of this patent is extended or adjusted under 35 U.S.C. 154(b) by 60 days.

(21) Appl. No.: 13/477,216

(22) Filed: May 22, 2012

(65) Prior Publication Data

US 2012/0307270 A1 Dec. 6, 2012

(30) Foreign Application Priority Data

May 30, 2011 (JP) ................................ 2011-120071

(51) Int. Cl.
*H04N 1/60* (2006.01)
(52) U.S. Cl.
USPC ........... 358/1.9; 358/3.23; 358/520; 345/601; 382/164
(58) Field of Classification Search
USPC ........ 358/1.9, 2.1, 3.01, 3.23, 3.27, 518, 520; 345/581, 589, 593, 594, 601; 382/162, 382/164, 167; 348/650
See application file for complete search history.

(56) References Cited

U.S. PATENT DOCUMENTS

| | | | | |
|---|---|---|---|---|
| 6,297,826 | B1 * | 10/2001 | Semba et al. | 345/589 |
| 6,326,974 | B1 * | 12/2001 | Satoh et al. | 345/601 |
| 7,403,305 | B2 | 7/2008 | Nakajima | |
| 7,920,146 | B2 * | 4/2011 | Yamada | 345/594 |
| 2004/0114165 | A1 | 6/2004 | Nakajima | |
| 2006/0017855 | A1 * | 1/2006 | Yamada | 348/650 |
| 2008/0062443 | A1 * | 3/2008 | Olson | 358/1.9 |
| 2009/0185205 | A1 | 7/2009 | Nakajima | |
| 2010/0123915 | A1 * | 5/2010 | Kashimoto | 358/1.9 |
| 2010/0310160 | A1 | 12/2010 | Nakajima | |
| 2011/0128562 | A1 * | 6/2011 | Anazawa | 358/1.9 |
| 2012/0045126 | A1 * | 2/2012 | Tomohiro | 382/167 |
| 2012/0062914 | A1 * | 3/2012 | Iwamoto | 358/1.9 |

FOREIGN PATENT DOCUMENTS

| | | |
|---|---|---|
| JP | 4164674 B2 | 8/2008 |
| JP | 4217536 A | 11/2008 |
| JP | 2009-005031 A | 1/2009 |

OTHER PUBLICATIONS

JP 2005-167679 corresponds to JP 4164674.
JP2004356853 corresponds to JP 4217536.

* cited by examiner

*Primary Examiner* — Kimberly A Williams
(74) *Attorney, Agent, or Firm* — Harness, Dickey & Pierce, P.L.C.

(57) ABSTRACT

An image processing apparatus includes a plurality of color conversion tables for color-separation-limited printing. Using a color conversion table for color-separation-limited printing, a piece of input color information corresponding to chromatic color within a specified applying hue range for a specified specific color is converted into a piece of output color information corresponding to color having hue of the specific color, and a piece of the input color information corresponding to color outside of the applying hue range is converted into a piece of the output color information corresponding to gray color. Each of the color conversion tables for color-separation-limited printing is configured such that color values corresponding to saturation and lightness of the output color information are reduced at least in gradation from a maximum saturation part to a low-lightness part.

9 Claims, 10 Drawing Sheets

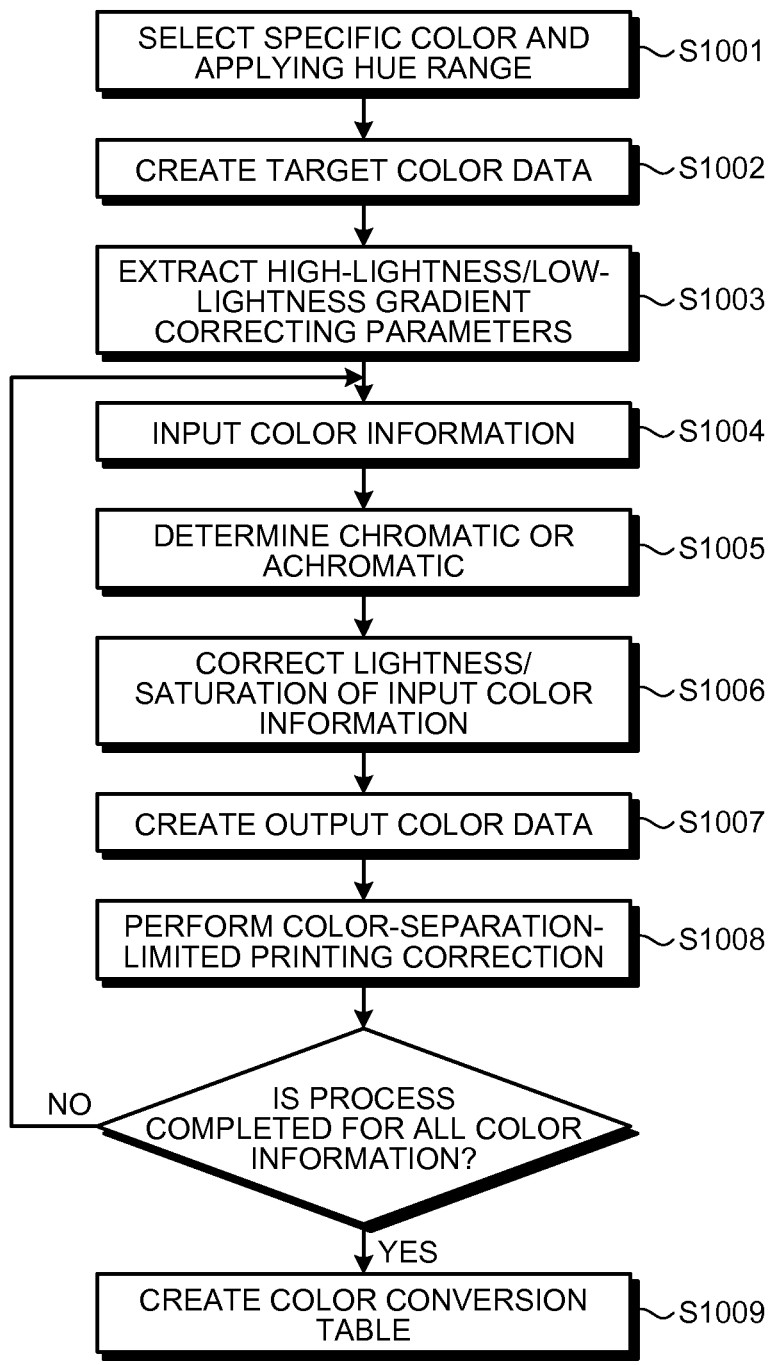

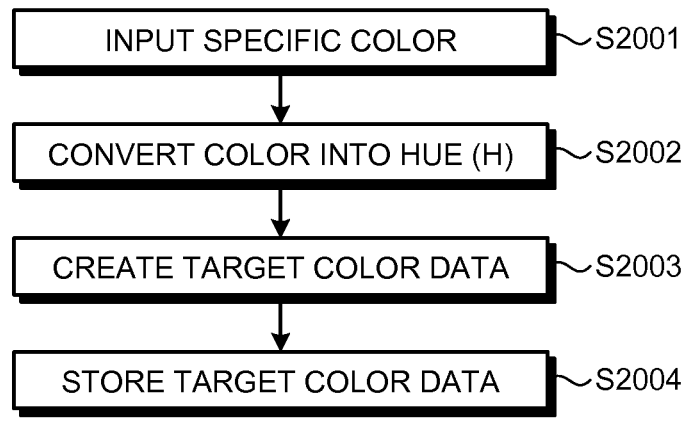
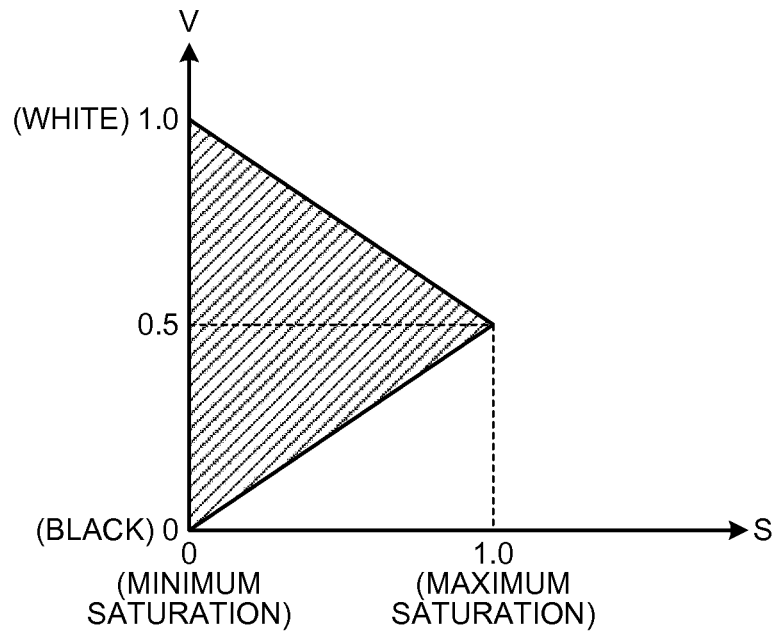

IMAGE PROCESSING APPARATUS AND COLOR CONVERSION TABLE GENERATING METHOD

CROSS-REFERENCE TO RELATED APPLICATIONS

The present application claims priority to and incorporates by reference the entire contents of Japanese Patent Application No. 2011-120071 filed in Japan on May 30, 2011.

BACKGROUND OF THE INVENTION

1. Field of the Invention

The present invention relates to an image processing apparatus and a method for generating a color conversion table used for color-separation-limited printing by the image processing apparatus.

2. Description of the Related Art

Writing with a pen using a colorant in a color other than black on a part, to be highlighted, to be corrected, etc., of a computer-aided designing (CAD) drawing or a document that is printed on paper is sometimes performed. When a document on which such writing with the pen is performed is scanned with a scanner or the like to form electronic data thereof and to print it with a printer or the like, image processing is sometimes applied to make the part, on which writing with the pen is performed, stand out.

For such an application, a method called color-separation-limited printing is known in which color within a given hue range among color in information of full-color input images is output using two different color materials (for example, magenta toner and black toner), number of which are less than number of color materials used in ordinary full-color printing, and color outside of the given hue range is output using a single toner (for example, black toner) from the viewpoint of toner saving.

In conventional color-separation-limited printing, to reduce difference in printed color compared with ordinary printing and to share common processes with the ordinary printing, the same color conversion and black generation parameters as the ordinary printing are used and the same image processing as the ordinary printing is performed, and a some number of resultant color separation images are forcibly deleted. As a result, missing color or excessive separation in gradient (too small separation in gradient) might be formed particularly in color from a high-saturation part to low-lightness part.

For example, in the technology disclosed in Japanese Patent No. 4217536, color to be used in printing is specified, and an input color image signal is converted into a multi-valued signal representing the specified color by making two of the CMY components have the same value. The black generation process is then performed on the multi-valued signal, thereby outputting a multi-valued CMYK signal. However, this technology does not solve the problem of formation of visible excessive separation in gradient formed in color from the high-saturation part to low-lightness part.

There is a need to provide an image processing apparatus that can prevent missing color in color-separation-limited printing, while maintaining the gradation characteristics and visibility in color from the high-saturation part to the low-lightness part, and a method for generating a color conversion table used for color-separation-limited printing by the image processing apparatus.

SUMMARY OF THE INVENTION

It is an object of the present invention to at least partially solve the problems in the conventional technology.

An image processing apparatus includes a plurality of color conversion tables for color-separation-limited printing, for each of a plurality of specific colors and for each of applying hue ranges for the specific color. Using a color conversion table for color-separation-limited printing for specified one of the specific colors and specified one of the applying hue ranges for that one of the specific colors, a piece of input color information corresponding to chromatic color within the specified applying hue range for the specified specific color is converted into a piece of output color information corresponding to color having hue of the specific color, and a piece of the input color information corresponding to achromatic color within the specified applying hue range for the specified specific color and a piece of the input color information corresponding to color outside of the applying hue range is converted into a piece of the output color information corresponding to gray color. Each of the color conversion tables for color-separation-limited printing is configured such that, for each of the specific colors, color values corresponding to saturation and lightness of the output color information are reduced at least in gradation from a maximum saturation part to a low-lightness part.

A color conversion table generating method executed by a computer in an image processing apparatus to generate a color conversion table for color-separation-limited printing used to convert a piece of input color information corresponding to chromatic color within a specified applying hue range for a specified specific color into a piece of output color information corresponding color having hue of the specific color, and to convert a piece of the input color information corresponding to achromatic color within the specified applying hue range for the specified specific color and a piece of the input color information corresponding to color outside of the applying hue range into a piece of the output color information corresponding to gray color, wherein the computer executes: selecting a specific color and an applying hue range for the specific color; creating, for the selected specific color, target color data made up from gradient colors ranging from a maximum saturation part to a minimum saturation part and ranging from white through the specific color to black; extracting, for the selected specific color, a correcting parameter used to reduce color values corresponding to saturation and lightness of the output color information; receiving color information of standard full color (hereinafter, referred to as input color information); creating output color data by assigning, when the input color information corresponds to color within the selected applying hue range for the selected specific color, a gradient color from the target color data based on lightness and saturation of the input color information, and assigning, when the input color information corresponds to color outside of the applying hue range for the specific color, a gradient color of gray color from the target color data based on the lightness of the input color information; creating output color information by correcting lightness and saturation of the output color data using the correcting parameter, and removing a black component contained in a gradient color in a high-lightness part of the corrected output color data; and generating a color conversion table by associating the input color information with the output color information, and storing the color conversion table in a storage device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 illustrates a flowchart of the entire process performed by a color conversion table generating unit for color-separation-limited printing according to the embodiment;

FIG. 5 is a detailed flowchart of a process performed by a target color data creating unit;

FIG. 6 is a schematic illustrating a relationship between the hue, saturation, and value (HSV) color space and target color data;

DETAILED DESCRIPTION OF THE PREFERRED EMBODIMENTS

An embodiment of the present invention will now be explained in detail with reference to drawings.

Figure 1:
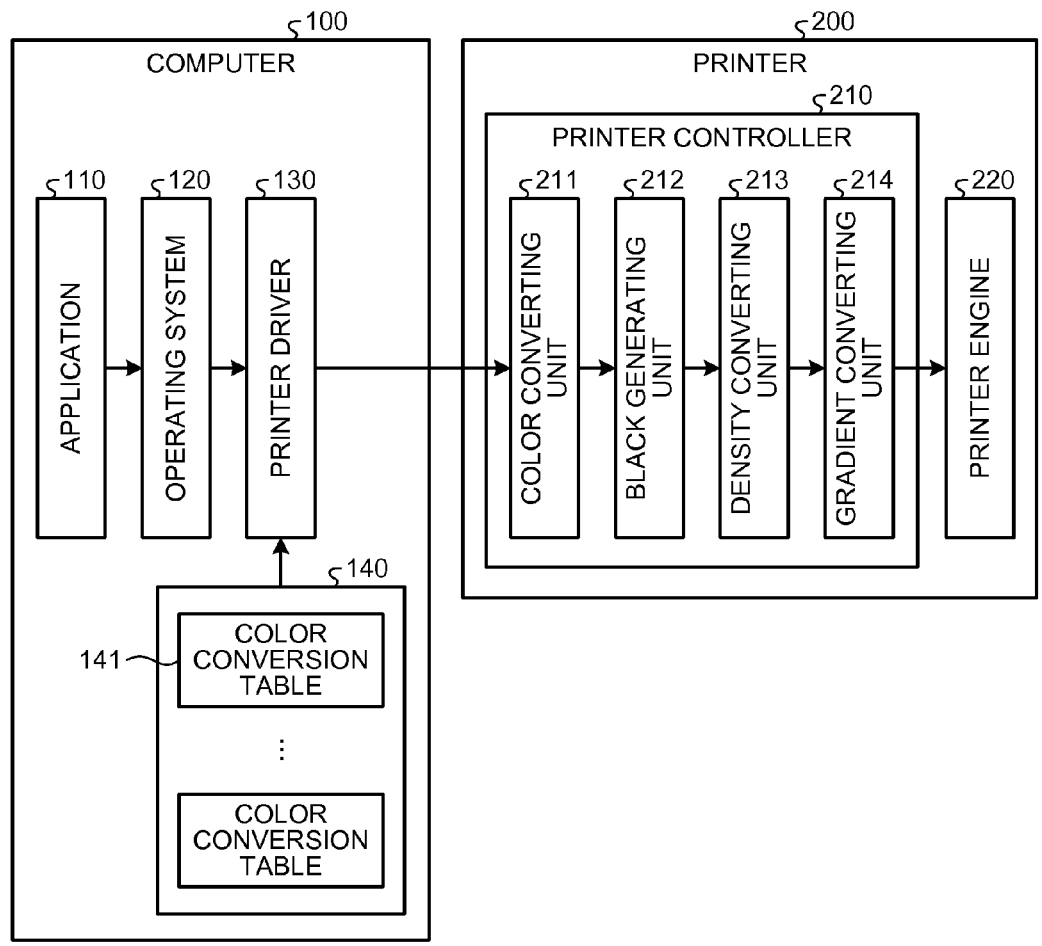
FIG. 1 is a schematic of an overall configuration of an image processing apparatus according an embodiment of the present invention.

FIG. 1 illustrates a schematic of an overall configuration of an image processing apparatus according the embodiment. In FIG. 1, the reference numeral 100 represents a computer as an image processing apparatus and the reference numeral 200 represents a printer as an image forming apparatus. The computer 100 and the printer 200 are connected to each other over a wire or wirelessly.

The computer 100 includes an application 110, an operating system (OS) 120, a printer driver 130, and a data storage 140. The data storage 140 stores therein a plurality of color conversion tables (look-up tables (LUTs)) 141 for ordinary printing and color-separation-limited printing. The color conversion tables for color-separation-limited printing are prepared, number of the color conversion tables prepared for each one of specific colors (for example, C, M, and Y) corresponding to number of applying hue ranges for that one of the specific colors.

Figure 2:
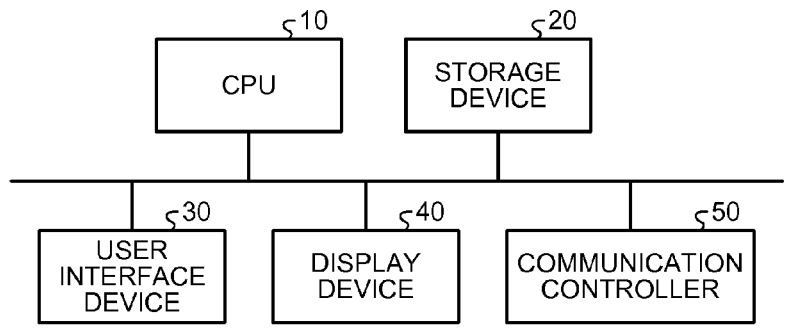
FIG. 2 is a schematic of a hardware configuration of the computer illustrated in FIG. 1.

FIG. 2 is a schematic illustrating a hardware configuration of the computer 100. In FIG. 2, the computer 100 includes a central processing unit (CPU) 10 that performs various processing, a storage device 20 storing therein various types of software and data required for processes executed by the CPU 10, a user interface device 30 such as a keyboard and a mouse, a display device 40 that displays information, and a communication controller 50 that controls transmissions and receptions of information to and from the printer 200 and other external devices. A random access memory (RAM), a read-only memory (ROM), and a hard disk drive (HDD) are collectively referred to as the storage device 20. In the actual operation, the application 110, the OS 120, and the printer driver 130 illustrated in FIG. 1 operate on the CPU 10. As the data storage 140 illustrated in FIG. 1, an HDD, for example, included in the storage device 20 is used.

Referring back to FIG. 1, the printer 200 includes a printer controller 210 and a printer engine 220. The printer controller 210 further includes a color converting unit 211, a black generating unit 212, a density converting unit 213, and a gradient converting unit 214. A hardware configuration of the printer controller 210 is basically the same as that illustrated in FIG. 2.

Printing operations in FIG. 1 will now be explained. When a user issues an instruction to print image data such as a result of processing, the application 110 on the computer 100 sends the image data to the printer driver 130 via the OS 120. When color-separation-limited printing is to be performed, the user instructs a specific color to be used in the output (for example, one of CMY) and an applying hue range for the specific color (for example, the entire hue range, ±30 degrees including the specific color, or ±60 degrees including the specific color).

The printer driver 130 adds various information to the image data so that such information can be used by the printer engine 220 to control printing. For color information (RGB), the printer driver 130 performs a color conversion by converting input color information (RGB) to output color information (R'G'B') by referring to a predetermined color conversion table 141 stored in the data storage 140 and by using a linear interpolation, for example. Specifically, to perform ordinary printing, the printer driver 130 performs a color conversion by referring to a color conversion table for ordinary printing (for full-color printing) stored in the data storage 140. To perform color-separation-limited printing, the printer driver 130 performs a color conversion by referring to a color conversion table for color-separation-limited printing stored in the data storage 140 and corresponding to the specific color and the applying hue range that have been specified. More specifically, when the color-separation-limited printing is to be performed, if input color information represents a chromatic color within the applying hue range for the specified specific color, the input color information is converted into output color information of the specific color using the color conversion table for color-separation-limited printing and corresponding to the specified specific color and the applying hue range for the specific color. If the input color information represents an achromatic color within the applying hue range of the specified specific color or a color outside of the applying hue range, the input color information is converted into output information of a gray color.

A configuration of and generation of the color conversion table used for color-separation-limited printing is one characteristic of the present invention, and will be explained later.

The image data applied with the color conversion (hereinafter, referred to as RGB data) is sent to the printer 200. In the printer controller 210 included in the printer 200, the color converting unit 211 converts the RGB data received from the computer 100 into CMY data, and the black generating unit 212 generates CMYK data from the CMY data. The density converting unit 213 then performs a density conversion (y conversion) to the CMYK data, and the gradient converting unit 214 performs a gradient conversion to the CMYK data applied with the density conversion.

In the ordinary printing, as print data, the printer controller 210 outputs a color separation image for K toner, a color separation image for C toner, a color separation image for M toner, and a color separation image for Y toner that are generated in the gradient conversion performed by the gradient converting unit 214 as they are to the printer engine 220 as print data. By contrast, in the color-separation-limited printing, the printer controller 210 deletes color separation image data for colors other than the specific color from the generated color separation images for K toner, C toner, M toner, and Y toner, and outputs the color separation image data for the specific color and the K data to the printer engine 220 as print data.

The printer engine 220 performs ordinary full-color printing using toners of four colors of CMYK, or performs color-separation-limited printing using a toner of one of CMY and a K toner, based on the print data received from the printer controller 210.

In the configuration illustrated in FIG. 1, the color conversion tables are stored in the computer 100. Alternatively, the color conversion tables may be stored in the printer 200, and the printer controller 210 may perform the color conversion of the RGB data before converting the RGB data into the CMY data. In such a configuration, the printer 200 functions as the image processing apparatus as well.

The color conversion table for color-separation-limited printing which is a characteristic of the present invention will now be explained. In the color-separation-limited printing, missing color or excessive separation in gradient (too small separation in gradient) becomes more prominent in color from a high-saturation part to a low-lightness part of a specific color. Therefore, in the color conversion table for color-separation-limited printing, in gradation from the maximum-saturation color to the minimum-lightness color of the specific color, which is generated from the toner of the specific color and the black toner, color values (RGB values) corresponding to the saturation and lightness of output color information are reduced to values lower than those of the original to the degree that any visible excessive separation in gradient becomes not generated so that the maximum saturation, the saturation of color other than the minimum lightness color, and lightness reduce. This is achieved by multiplying given correcting parameters (reduction ratios) to the respective original color values. The reduction ratios are determined in advance based on, for example, visual evaluations conducted on printing results. In this manner, in color-separation-limited printing, missing color can be prevented while maintaining the gradation characteristics and visibility in color from the high-saturation part to the low-lightness part of the specific color.

The color values corresponding to the saturation and the lightness of the output color information are reduced by different degrees depending on the specific color. For example, when the specific colors are in YMCK, the color values are lowered more for Y than C, and more for C than M. This setting is more effective because a lighter specific color is printed darker.

The color values corresponding to the saturation and the lightness of the output color information may be reduced only for the low-lightness part, or reduced separately for both of a high-lightness part and the low-lightness part. In the latter case, the color value may be reduced by a larger degree in the low-lightness part than in the high-lightness part. In this manner, when color-separation-limited printing is performed, excessive separation in gradient (too small separation in gradient) around the maximum-saturation part in a region closer to the high-lightness part of the specific color can be reduced.

A structure of an apparatus and a method for generating the color conversion table for color-separation-limited printing will now be explained.

Figure 3:
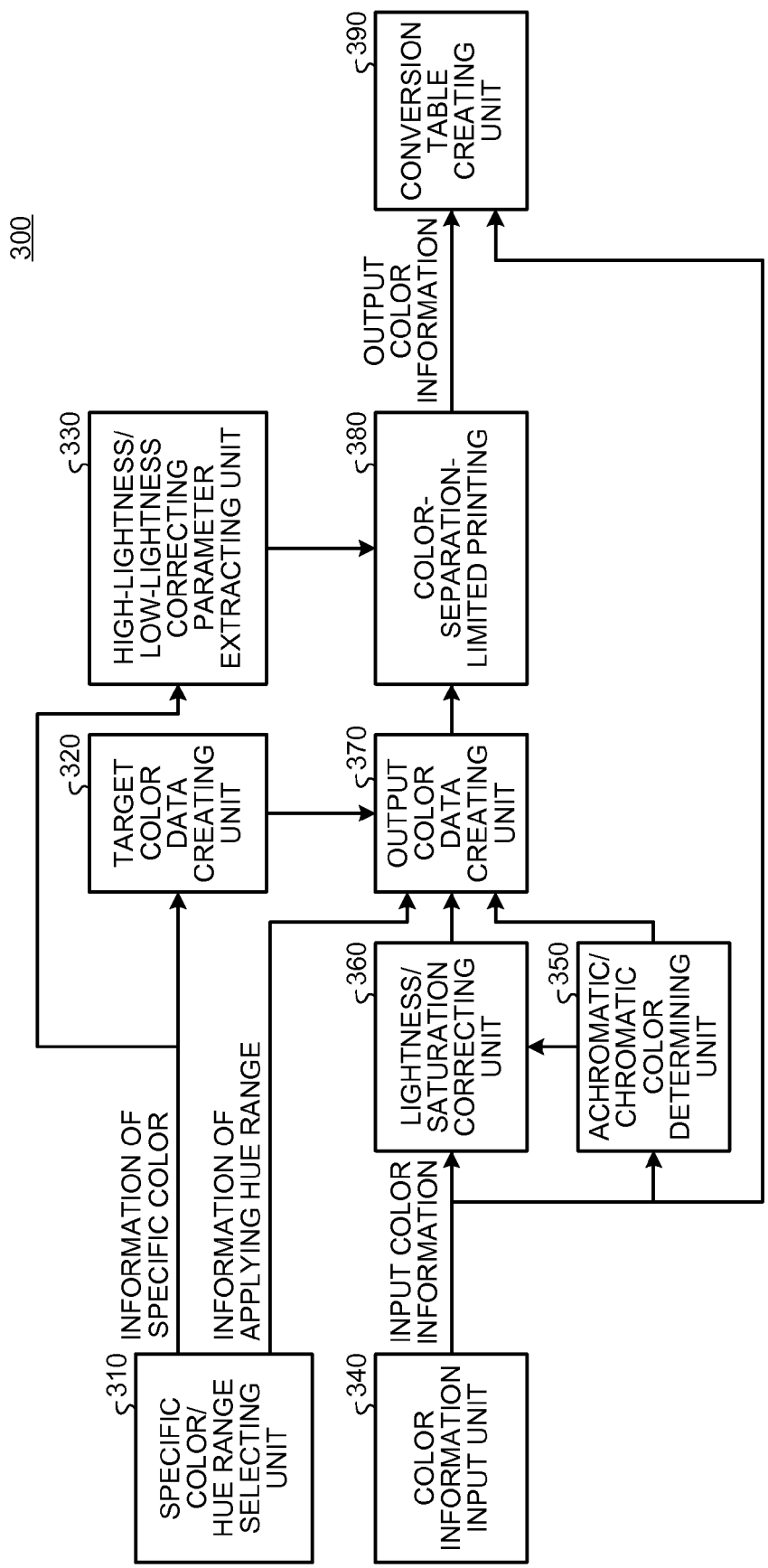
FIG. 3 is a functional block diagram of a color conversion table generating unit for color-separation-limited printing according to the embodiment.

FIG. 3 is a block diagram of a color conversion table generating unit for color-separation-limited printing according to the embodiment. Generally, the color conversion table generating unit for color-separation-limited printing may be preferably provided in the computer 100 illustrated in FIG. 1, but may be provided in the printer 200. Alternatively, a separate computer may have similar function, and color conversion tables generated by that computer may be loaded to the computer 100 or the printer 200 illustrated in FIG. 1.

As illustrated in FIG. 3, a color conversion table generating unit for color-separation-limited printing 300 in the present embodiment includes a specific color/hue range selecting unit 310, a target color data creating unit 320, a high-lightness/low-lightness correcting parameter extracting unit 330, a color information input unit 340, an achromatic/chromatic color determining unit 350, a lightness/saturation correcting unit 360, an output color data creating unit 370, a color-separation-limited printing correcting unit 380, and a conversion table creating unit 390. A hardware configuration of the color conversion table generating unit for color-separation-limited printing is basically the same with that illustrated in FIG. 2.

FIG. 4 illustrates a flowchart of the entire process performed by the color conversion table generating unit for color-separation-limited printing 300 according to the present embodiment. In FIG. 4, processes at Step S1004 to Step S1008 are sequentially executed repeatedly for all of color information of standard full colors.

To begin with, processes performed by and operations of the specific color/hue range selecting unit 310, the target color data creating unit 320, and the high-lightness/low-lightness correcting parameter extracting unit 330 will be explained. These units are caused to operate one time every time a specific color and an applying hue range are specified.

The specific color/hue range selecting unit 310 selects a specific color to be output by the printer from a plurality of specific colors, and an applying hue range in the input color information to which the specific color is applied from a plurality of predetermined applying hue ranges (Step S1001). In the present embodiment, one of CMY is selected as the specific color, and one is selected from a group consisting of the entire hue range, a range of ±30 degrees including the specific color, and a range of ±60 degrees including the specific color as the applying hue range. Alternatively, an operator or the like may input the specific color and the applying hue range directly. In such a case, the specific color/hue range selecting unit 310 can be omitted.

The target color data creating unit 320 creates target color data that is used by the output color data creating unit 370, which will be explained later, to create output color data based on the information of the specific color selected by the specific color/hue range selecting unit 310 (Step S1002). In the present embodiment, target color data is created by extracting data corresponding to hue of the specific color from uniform data (L*a*b* values) over all hue in HSV color space (H: hue, S: saturation, V: lightness). The uniform data (L*a*b* values) in the HSV color space is prepared in advance, and stored in the storage device. Alternatively, similar processes can be conducted using HLS color space instead of the HSV color space.

FIG. 5 illustrates a detailed flowchart of the process performed by the target color data creating unit 320. The target color data creating unit 320 receives the information of the specific color (one of CMY) selected by the specific color/hue range selecting unit 310 (Step S2001). The specific color is then converted into a hue (H) in the HSV color space (Step S2002). Hue (H) is represented as 0 degree to 360 degrees relative to red. For example, Y (yellow) is converted into 60 degrees, C (cyan) is converted into 180 degrees, and M (magenta) is converted into 300 degrees. The target color data creating unit 320 Then, data (L*a*b* values) corresponding to the hue of the specific color are extracted from the uniform data, which have been prepared in advance, in all hue (L*a*b* values) in the HSV color space to use the extracted data as target color data for the specific color (Step S2003). Finally, the target color data thus created is stored in the storage device (Step S2004).

FIG. 6 is a schematic illustrating the relationship between the HSV color space and the target color data. In FIG. 6, the plane in parallel with the paper surface is a hue plane of the specific color and the hatched area represents an area of the target color data for the specific color. As illustrated in FIG. 6, the target color data consist of gradient colors (L*a*b* values) in white—the specific color—black, which cover the entire range from the maximum saturation (1.0) to the minimum saturation (0.0). In the actual operation, the uniform color space values (L*a*b* values) of representative points in hue of the specific color and in the HSV color space are stored in the storage device as target color data.

The high-lightness/low-lightness correcting parameter extracting unit 330 extracts correcting parameters to be used by the color-separation-limited printing correcting unit 380, which is to be explained later, to correct output color data based on the information of the specific color selected by the specific color/hue range selecting unit 310 (Step S1003). In the present embodiment, correcting parameters for high-lightness part and low-lightness part are stored in the storage device, for each of CMY used in the color-separation-limited printing. The high-lightness/low-lightness correcting parameter extracting unit 330 reads high-lightness/low-lightness correcting parameters for the specific color (one of CMY) from the storage device, and sends them to the color-separation-limited printing correcting unit 380.

Processes performed by and operations of the color information input unit 340, the achromatic/chromatic color determining unit 350, the lightness/saturation correcting unit 360, the output color data creating unit 370, the color-separation-limited printing correcting unit 380, and the conversion table creating unit 390 will now be explained. It is assumed that color information of the standard full-color (RGB values) used as a reference in generating the color conversion tables is stored in the storage device in advance, for example, by reading a color chart.

The color information input unit 340 sequentially reads color information of the standard full-color (RGB value) from the storage device (Step S1004). The color information of the standard full-color (RGB value) are values such as (0, 0, 0), (0, 0, 16), (0, 0, 32) . . . (255, 255, 220), (255, 255, 240), and (255, 255, 255). The color information sequentially read from the storage device by the color information input unit 340 is sent to the achromatic/chromatic color determining unit 350, the lightness/saturation correcting unit 360, and the conversion table creating unit 390.

The achromatic/chromatic color determining unit 350 determines if the input color information (RGB values) corresponds to achromatic or chromatic (Step S1005). Specifically, if all of the RGB values are equal, the input color information is determined as corresponding to achromatic; if not, the input color information is determined as corresponding to chromatic. The result of determination made by the achromatic/chromatic color determining unit 350 is sent to the lightness/saturation correcting unit 360 and the output color data creating unit 370.

The lightness/saturation correcting unit 360 performs a process of correcting the lightness (brightness) and/or the saturation of the input color information depending on the hue of the input color information (Step S1006). For example, if the hue of the input color information is a lighter color near yellow, printing might result in a lighter or washier color, depending on the specific color used in an output from the printer, and thus a process of reducing the lightness (brightness) is performed. In other words, visibility is improved by printing a color, which is light on the monitor so that it would be printed in a washy color, in a darker color.

Figure 7:
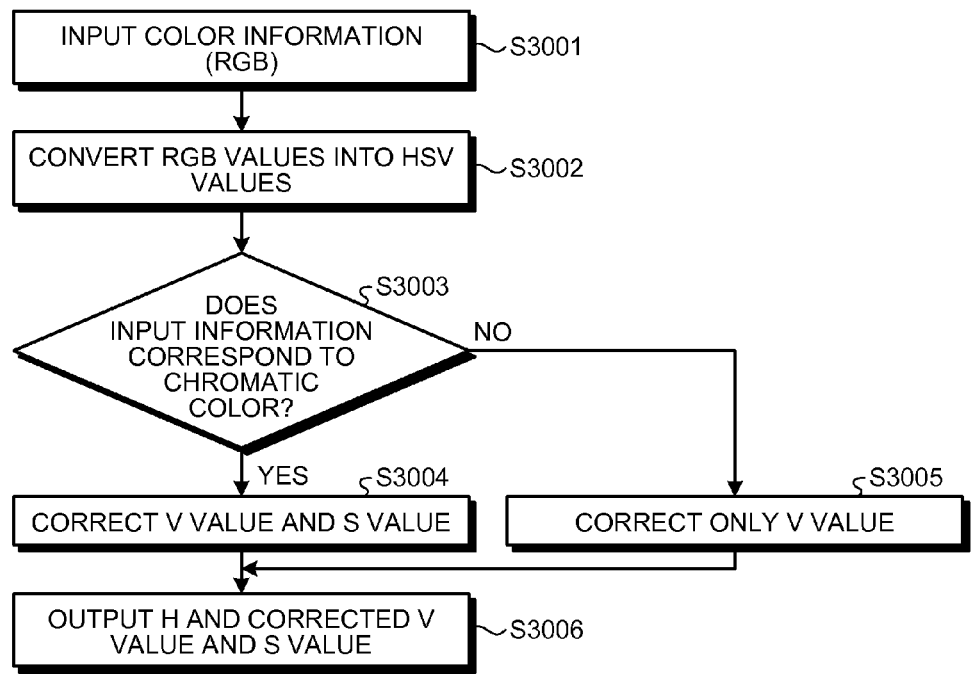
FIG. 7 is a detailed flowchart of a process performed by a lightness/saturation correcting unit.

FIG. 7 illustrates a detailed flowchart of the process performed by the lightness/saturation correcting unit 360. The lightness/saturation correction unit 360 receives color information from the color information input unit 340 (Step S3001), and converts RGB values of the input color information into HSV values (HLS values are also possible) (Step S3002). Whether the input color information corresponds to chromatic color or achromatic color is also determined based on the result of determination made by the achromatic/chromatic color determining unit 350 (Step S3003). If the input color information is chromatic, the values of V (lightness) and S (saturation) is corrected depending on the value of hue (H) (Step S3004). On the other hand, if the input color information is achromatic, only the V value is corrected (Step S3005). The correcting process is performed simply by multiplying predetermined correcting parameters (reduction ratios α) to the V value and the S value, respectively. The required correcting parameters are stored in the storage device and the like in advance. The lightness/saturation correcting unit 360 then outputs the corrected V value and S value together with the H value (Step S3006).

The output color data creating unit 370 receives the HSV values corresponding to the input color information output from the lightness/saturation correcting unit 360, and creates output color data using the target color data corresponding to the specific color and prepared by the target color data creating unit 320 in advance, based on the corrected S value and V value (Step S1007). As illustrated in FIG. 6, the target color data consists of gradient colors (L*a*b* values) in white—the specified color (at saturation between 0.0 and 1.0)—black. The output color data creating unit 370 assigns predetermined gradient colors (L*a*b* values) of the target color data, based on the corrected S value and V value, to create the output color data.

Figure 8:
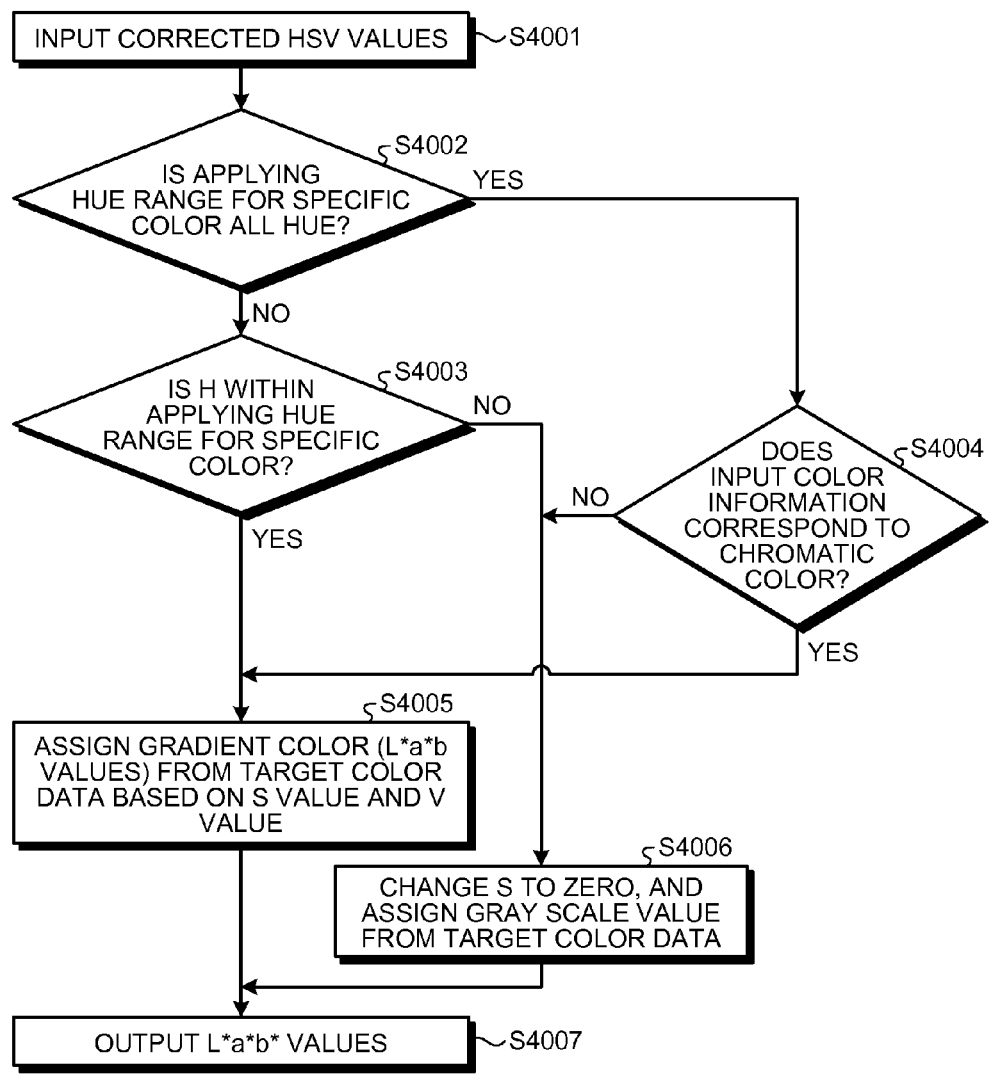
FIG. 8 is a detailed flowchart of a process performed by an output color data creating unit.

FIG. 8 illustrates a detailed flowchart of the process performed by the output color data creating unit 370. The output color data creating unit 370 receives the corrected HSV values corresponding to the input color information from the lightness/saturation correcting unit 360 (Step S4001). Then, if the applying hue range for the specific color is all hue is determined based on the information of the applying hue range output from the specific color/hue range selecting unit 310 (Step S4002). It is assumed for now that the applying hue range for the specific color is not all hue (for example, a range of ±30 degrees or ±60 degrees including the specific color). In such a case, if the H (hue) value in the received HSV values is within the applying hue range for the specific color is determined (Step S4003). If the H value is within the applying hue range for the specific color, a predetermined gradient color (L*a*b* values) in the target color data for the specific color is assigned as output color data based on the S (saturation) value and the V (lightness) value of the received HSV values (Step S4005). If the H value is outside of the applying hue range for the specific color, the S value in the received HSV values is changed to zero, and a gray scale value (L*a*b* value) (where, a*, b*=0) is assigned based on the V value, to create output color data (Step S4006).

By contrast, if the applying hue range for the specific color is all hue, the output color data creating unit 370 checks if the input color information corresponds to chromatic color or achromatic color based on the result of determination of achromatic color/chromatic color output from the achromatic/chromatic color determining unit 350 (Step S4004). If the input color information corresponds to chromatic color, a predetermined gradient color (L*a*b* values) in the target color data for the specific color is assigned based on the values of S and V of the input HSV values to create output color data (Step S4005). If the input color information corresponds to achromatic color, the S value of the input HSV values is changed to zero, and a gray scale value (L*a*b* values) (where, a*, b*=0) is assigned based on the V value to create output color data (Step S4006).

The output color data creating unit 370 then outputs the output color data (L*a*b* values) created for the input color information (Step S4007).

Figure 9:
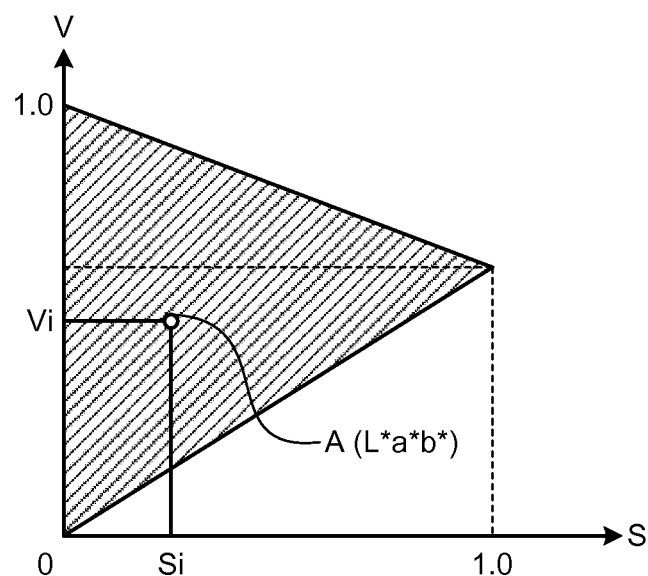
FIG. 9 is a conceptual schematic illustrating the process performed by the output color data creating unit.

FIG. 9 is a conceptual schematic illustrating the process of assigning a gradient color (L*a*b* values) from the target color data for the specific color based on the corrected S value and V value corresponding to the input color information. The hatched area in FIG. 9 is the same as that illustrated in FIG. 6, and represents a distribution, in the HSV value space, of gradient colors (L*a*b* values) in the target color data for a hue of a certain specific color (for example, Y color). When the corrected S value and V value corresponding to the input color information are Si and Vi, respectively, the gradient color (L*a*b* values) at the point A will be used as the output color data. For the gray scale, Si is changed to 0, and the L* value (a*, b*=0) at the point corresponding to Vi and on the V axis is used.

As explained earlier, in practice, the hatched area in FIG. 9 is a set of uniform color space values (L*a*b* values) of representative points in the HSV color space. Therefore, a gradient color mat be absent at the point A corresponding to the values of the Si and Vi. In such a case, the gradient color (L*a*b* values) at the point A may be obtained based on the gradient colors near the point A, for example, by using interpolation processing.

The color-separation-limited printing correcting unit 380 corrects the saturation and the lightness of the output color data (L*a*b* values) created by the output color data creating unit 370 using high-lightness/low-lightness correcting parameters provided by the high-lightness/low-lightness correcting parameter extracting unit 330, and removes K component mixed in the high-lightness part (white—the maximum saturation part), to create output color information (RGB values) to be used for color-separation-limited printing (Step S1008).

Figure 10:
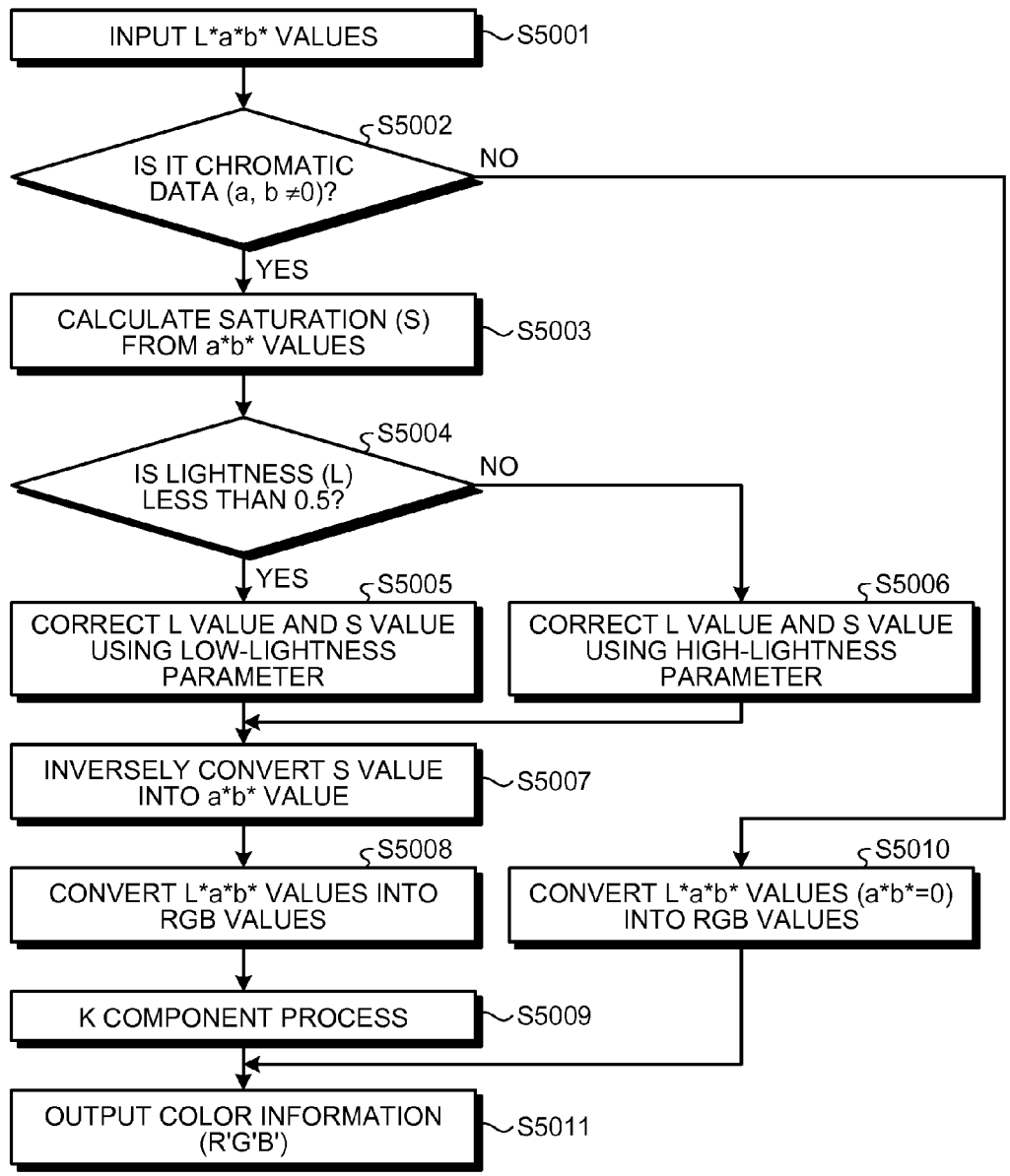
FIG. 10 is a detailed flowchart of a process performed by a color-separation-limited printing correcting unit.

FIG. 10 illustrates a detailed flowchart of the process performed by the color-separation-limited printing correcting unit 380. The color-separation-limited printing correcting unit 380 receives the output color data (L*a*b* values) output from the output color data creating unit 370 (Step S5001), and checks if the output color data is chromatic data (Step S5002). If a*, b*=0, the output color data is achromatic data. If a*, b*≠0, the output color data is chromatic data. If the output color data is achromatic data, the L*a*b* values (a*, b*=0) are directly converted into RGB values (Step S5010), and used as output color information (Step S5011).

On the other hand, if the output color data is chromatic data, the saturation (S) is calculated from the a*b* values of the output color data (L*a*b* values) (Step S5003). Then, the lightness (L* value) of the output color data is checked (Step S5004). Specifically, if the L* value is more than 0.5, the output color data is determined as having high lightness. If the L* value is less than 0.5, the output color data is determined as having low lightness. L* may also be converted into V to determine the lightness of the output data based on the value of V. If the output color data has low lightness, the saturation (S value) and the lightness (L* value) of the output color data are converted using the low-lightness correcting parameter for the specific color in question from the high-lightness/low-lightness correcting parameters (Step S5005). If the output color data has high lightness, the saturation (S value) and the lightness (L* value) of the output color data is corrected using the high-lightness correcting parameter for the specific color (Step S5006). This correction is achieved by multiplying the correcting parameter (reduction ratios β) to the S value and the L* value.

For example, in a low-lightness part where excessive separation in gradient and missing color tend to prominent, the reduction ratio β is set to 0.875 when the specific color is cyan (C), to 0.95 when the specific color is magenta (M), and to 0.5 when the specific color is yellow (Y). The reduction ratios β are set for a high-lightness part in a similar manner. Higher reduction ratios β (lower reduction degree) are set for the high-lightness range than those for the low-lightness range. These reduction ratios β are determined in advance by visual evaluations of printed results when the system is build, for example. The high-lightness/low-lightness correcting parameter extracting unit 330 extracts a reduction ratio β for the specific color from the reduction ratios β, and provides the extracted reduction ratio β to the color-separation-limited printing correcting unit 380. The color-separation-limited printing correcting unit 380 changes the color values of the output color data by multiplying the reduction ratio β to the S value and the L* value. The color values of the output color data may be corrected only for the low-lightness part (L* value<0.5) where the excessive separation in gradient and missing color tend to be prominent. In such a case, the process at Step S5006 is skipped.

Figure 11A:
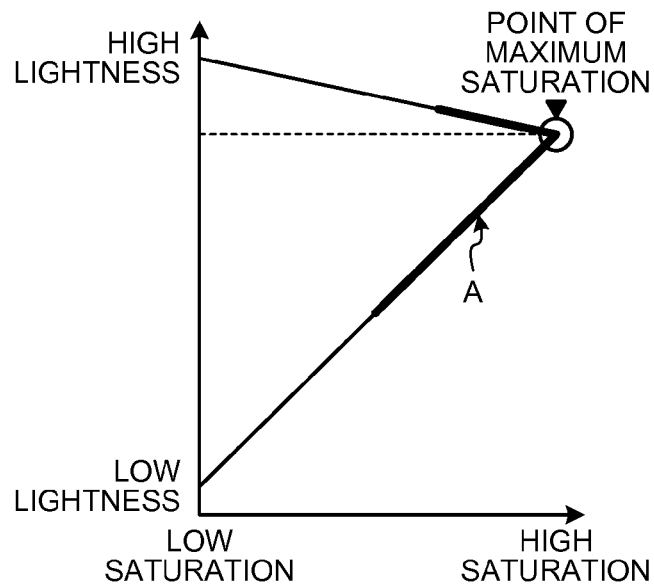
FIGS. 11A and 11B are conceptual schematics of the process performed by the color-separation-limited printing correcting unit.
Figure 11B:
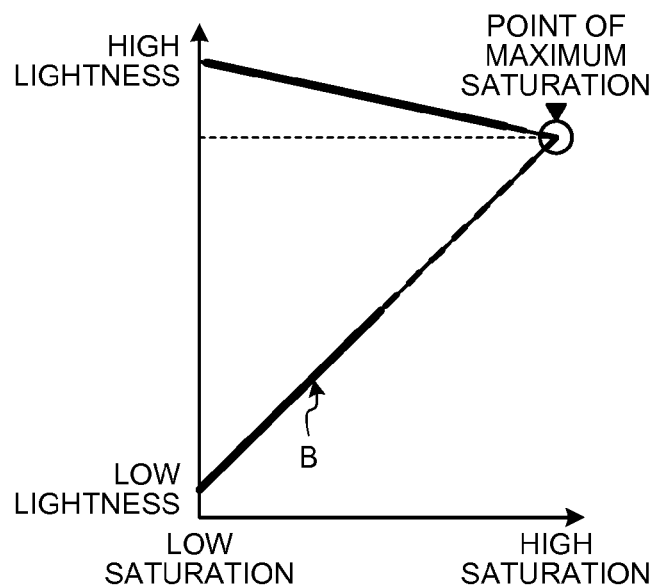

FIGS. 11A and 11B illustrate a concept of the output color data correcting process performed by the color-separation-limited printing correcting unit 380. In this example, the specific color is assumed to be yellow (Y) that is a relatively light color. Missing color and excessive separation in gradient (too small separation in gradient) generated between before and after color-separation-limited printing are more prominent in a specific color having high lightness such as Y.

In the ordinary printing using the CMYK toners, for gradation from the maximum saturation part to low lightness part, CMY toners are used from the maximum-saturation part to the midpoint in the low-lightness part to make color gradually approach achromatic color, and CMYK toners are used from the midpoint to the low-lightness part to make color gradually approaches achromatic color. Because hue near yellow have high lightness, in the ordinary printing, from the maximum saturation part to the midpoint in the low-lightness part, printing is performed using an increased amount of C toner and M toner to prevent missing color/too small separation in gradient. By contrast, when color-separation-limited printing is performed for the specific color Y, only Y toner and K toner are used, without using C toner and M toner. Therefore, missing color/too small separation in gradient become more prominent in the part indicated by a bold line (A) in FIG. 11A. Therefore, from the maximum-saturation part to the low-lightness part, color values corresponding to the saturation/lightness of the output color data are reduced using the reduction ratio β as a coefficient, to change the color values into the range indicated by a bold line (B) in FIG. 11B. Thereby, printing is performed using a larger amount of K toner, and missing color/too small separation in gradient is improved.

FIGS. 11A and 11B depict the process performed only for the low-lightness gradients in which missing color and excessive separation in gradient are more prominent. When too small separation in gradient is prominent around the maximum-saturation part in a region closer to the high-lightness part, a similar correction process is performed on the output color data using the reduction ratio β as coefficient.

Referring back to FIG. 10, after correcting the saturation and the lightness of the output color data, the color-separation-limited printing correcting unit 380 inversely converts the saturation value (S value) into the a*b* value, to obtain L*a*b* values again (Step S5007), and converts those L*a*b* values into RGB values (Step S5008). In other words, for output color data (L*a*b* values) that are uniformly distributed in the HSV value space, the color information (RGB value) corresponding to the output color data that is corrected for use in color-separation-limited printing is obtained. From that color information (RGB values), a slight amount of K (black) component remaining in the high-lightness part (white—the maximum saturation color) is removed (Step S5009) to obtain the output color information (Step S5011).

If a small amount of K component is included during the color-separation-limited printing, granular quality deteriorates (visibility deteriorates). Therefore, if the hue of the input color information is near yellow, the K component in the high-lightness part is removed regardless of what the specific color is. If the hue is not near yellow, in a gradient colors in white—the specific color, when the K value is equal to or lower than a predetermined level (for example, equal to or lower than 12/255), the K component is removed. Specifically, the RGB is converted into CMY, the black generating process is applied to CMY to obtain CMYK, and the K value in the CMYK is subjected to threshold processing to remove the small amount of K component. CMY is then again inversely converted into RGB.

The processes performed by units from the achromatic/chromatic color determining unit 350 to the color-separation-limited printing correcting unit 380 illustrated in FIG. 3 are performed repeatedly for each of pieces of information corresponding to the respective colors (input color information) included in the standard full colors that are output from the color information input unit 340. As a result, the color-separation-limited printing correcting unit 380 outputs, sequentially for each piece of color information (input color information) included in the standard full colors, pieces of color information (output color information) to be used for color-separation-limited printing in a given specific color.

Figure 12:
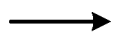
FIG. 12 is a schematic of a specific example of the color conversion table for color-separation-limited printing.

The conversion table creating unit 390 receives pieces of the input color information each of which corresponds to each of the colors in the standard-full color and is output from the color information input unit 340, and pieces of the output color information for color-separation-limited printing, each piece of which corresponds to each piece of the input color information and which are output from the color-separation-limited printing correcting unit 380, and creates a color conversion table (Step S1009). Specifically, a look-up table is created by paring each piece of input color information (RGB) with corresponding piece of output information (R'G'B'). A specific example of the color conversion table is illustrated in FIG. 12.

In the manner described above, once the color conversion table for color-separation-limited printing is created for a certain specific color and a certain applying hue range for that specific color, the specific color/hue range selecting unit 310 selects next set of a specific color and an applying hue range for that specific color. By repeating this process, the color conversion tables for color-separation-limited printing are created for every specific color (for example, C/M/Y) and every applying hue ranges (for example, the entire hue range, ±30 degrees including the specific color, and ±60 degrees including the specific color).

The color conversion tables thus created for color-separation-limited printing are stored in the data storage 140 illustrated in FIG. 1, as well as the color conversion table for ordinary printing. The structure of the color conversion table for ordinary printing is the same as that of a conventional color conversion table.

The color conversion table for color-separation-limited printing is configured such that the color values corresponding to the saturation and lightness of output color information are reduced at least in gradation from the maximum-saturation part to low-lightness part. As a result, missing color in an image formed by color-separation-limited printing can be suppressed, while maintaining the gradient characteristics and visibility of the high-saturation part to low-lightness part.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a plurality of color conversion tables for color-separation-limited printing, for each of a plurality of specific colors and for each of applying hue ranges for the specific color, wherein
using a color conversion table for color-separation-limited printing for specified one of the specific colors and specified one of the applying hue ranges for that one of the specific colors, a piece of input color information corresponding to chromatic color within the specified applying hue range for the specified specific color is converted into a piece of output color information corresponding to color having hue of the specific color, and a piece of the input color information corresponding to achromatic color within the specified applying hue range for the specified specific color and a piece of the input color information corresponding to color outside of the applying hue range is converted into a piece of the output color information corresponding to gray color, and
each of the color conversion tables for color-separation-limited printing is configured such that, for each of the specific colors, color values corresponding to saturation and lightness of the output color information are reduced at least in gradation from a maximum saturation part to a low-lightness part.

2. The image processing apparatus according to claim 1, wherein each of the color conversion tables for color-separation-limited printing is further configured such that, for each of the specific colors, color values corresponding to saturation and lightness of the output color information are reduced in gradation from a high-lightness part to the maximum saturation part.

3. The image processing apparatus according to claim 1, wherein the color conversion table for color-separation-limited printing is further configured such that no black component is included in color values in a high-lightness part.

4. The image processing apparatus according to claim 1, wherein
the specific colors are cyan, magenta, and yellow, and the color values corresponding to saturation and lightness of the output color information are reduced to a larger degree for yellow than cyan, and to a larger degree for cyan than magenta.

5. The image processing apparatus according to claim 1, further comprising a unit that generates the color conversion tables for color-separation-limited printing.

6. The image processing apparatus according to claim 5, wherein the unit that generates the color conversion tables for color-separation-limited printing comprises:
- a unit that selects a specific color and an applying hue range for that specific color;
- a unit that creates, for the selected specific color, target color data made up from gradient colors ranging from maximum saturation to minimum saturation and ranging from white through the specific color to black;
- a unit that extracts, for the selected specific color, a correcting parameter used to reduce color values corresponding to saturation and lightness of the output color information;
- a unit that receives color information of standard full color (hereinafter, referred to as input color information);
- a unit that creates output color data by assigning, when the input color information is within the selected applying hue range for the selected specific color, a gradient color from the target color data based on lightness and saturation of the input color information, and assigning, when the input color information is outside of the selected applying hue range for the selected specific color, a gradient color of gray scale from the target color data based on the lightness of the input color information;
- a unit that creates output color information by correcting lightness and saturation of the output color data using the correcting parameter, and removing a black component contained in a gradient color in a high-lightness part of the corrected output color data; and
- a unit that generates a color conversion table by associating the input color information with the output color information.

7. The image processing apparatus according to claim 6, wherein the unit that generates a color conversion table for color-separation-limited printing further comprises:
- a unit that determines whether the input color information corresponds to chromatic color or achromatic color; and
- a unit that corrects lightness and saturation of the input color information when the input color information corresponds to chromatic color, and corrects lightness when the input color information corresponds to achromatic color, and
- the unit that creates output color data performs a process of creating the output color data using the corrected input color information.

8. A color conversion table generating method executed by a computer in an image processing apparatus to generate a color conversion table for color-separation-limited printing used to convert a piece of input color information corresponding to chromatic color within a specified applying hue range for a specified specific color into a piece of output color information corresponding color having hue of the specific color, and to convert a piece of the input color information corresponding to achromatic color within the specified applying hue range for the specified specific color and a piece of the input color information corresponding to color outside of the applying hue range into a piece of the output color information corresponding to gray color, wherein
the computer executes:
- selecting a specific color and an applying hue range for the specific color;
- creating, for the selected specific color, target color data made up from gradient colors ranging from a maximum saturation part to a minimum saturation part and ranging from white through the specific color to black;
- extracting, for the selected specific color, a correcting parameter used to reduce color values corresponding to saturation and lightness of the output color information;
- receiving color information of standard full color (hereinafter, referred to as input color information);
- creating output color data by assigning, when the input color information corresponds to color within the selected applying hue range for the selected specific color, a gradient color from the target color data based on lightness and saturation of the input color information, and assigning, when the input color information corresponds to color outside of the applying hue range for the specific color, a gradient color of gray color from the target color data based on the lightness of the input color information;
- creating output color information by correcting lightness and saturation of the output color data using the correcting parameter, and removing a black component contained in a gradient color in a high-lightness part of the corrected output color data; and
- generating a color conversion table by associating the input color information with the output color information, and storing the color conversion table in a storage device.

9. The color conversion table generating method according to claim 8, wherein the computer further executes:
- determining whether the input color information corresponds to chromatic color or achromatic color; and
- correcting lightness and saturation of the input color information when the input color information corresponds to chromatic color, and correcting lightness when the input color information corresponds to achromatic color, and
- the creating output color data is performed using the corrected input color information.

* * * * *